United States Patent [19]
Fairclough

[11] Patent Number: 6,089,709
[45] Date of Patent: Jul. 18, 2000

[54] SPECTACLE SUPPORT

[75] Inventor: Max Fairclough, Northampton, United Kingdom

[73] Assignee: Wichers Enterprises, Inc., Beloit, Kans.

[21] Appl. No.: 09/356,490

[22] Filed: Jul. 19, 1999

[30] Foreign Application Priority Data

Jul. 17, 1998 [GB] United Kingdom .................... 9815645

[51] Int. Cl.⁷ ....................................................... G02C 1/04
[52] U.S. Cl. ............................. 351/103; 351/89; 351/109
[58] Field of Search ................................... 351/41, 89, 93, 351/103, 104, 108, 109, 155; 2/452, 453

[56] References Cited

U.S. PATENT DOCUMENTS

| D. 228,677 | 10/1973 | Wichers | D57/1 F |
| D. 229,974 | 1/1974 | Wichers | D57/1 F |
| D. 295,533 | 5/1988 | Wichers | D16/122 |
| 3,701,591 | 10/1972 | Wichers | 351/41 |
| 3,944,344 | 3/1976 | Wichers | 351/41 |
| 4,240,718 | 12/1980 | Wichers | 351/62 |
| 5,729,321 | 3/1998 | Wielhouwer | 351/44 |
| 5,745,210 | 4/1998 | Biernat, Jr. et al. | 351/41 |

FOREIGN PATENT DOCUMENTS

| 683614 | 12/1948 | United Kingdom . |
| 779472 | 7/1957 | United Kingdom . |
| WO 97/50013 | 12/1997 | WIPO . |

*Primary Examiner*—Huy Mai
*Attorney, Agent, or Firm*—Shughart Thomson & Kilroy P.C.; Marcia J. Rodgers

[57] ABSTRACT

A spectacle support includes a unitary strip of spring steel material bent to provide a central curved forehead-engaging portion and a pair of rearwardly and extending arm portions which extend inwardly and downwardly behind the rear of the head of a wearer. The arm portions are stepped outwardly from the forehead-engaging portion, so that when positioned on the head of a wearer, the portions of the spectacle support overlying the temples are spaced outwardly off the temples and apply no pressure to them. By shaping the arm portions of the support, a single size can be worn comfortably by people having a wide range of head sizes and shapes. A lens sub-frame is secured to the central region of the spectacle support for attachment of the lenses. In certain preferred embodiments the support is hingedly coupled with the spectacle support and the lens sub-frame, to permit adjustment of the vertex distance of the lenses from the eyes of the wearer. In one embodiment the stepped portions of the frame may be bent so that the transverse dimension of the central portion extends horizontally, while the transverse dimension of the arm portions extends vertically, to provide added stiffness to the forehead portion of the support.

20 Claims, 7 Drawing Sheets

SPECTACLE SUPPORT

CROSS REFERENCE TO RELATED APPLICATION

This application is based on British Patent Application Serial No. 9815645.8, filed Jul. 17, 1998 and entitled SPECTACLE SUPPORT.

BACKGROUND OF THE INVENTION

The present invention relates to a spectacle support, that is to say the part of a pair of spectacles which, in use, is engaged with the head of a wearer to support a pair of lenses at the correct position relative to the eyes of the wearer.

For the purposes of this specification the term "lens" is to be construed broadly as covering optically active lenses used to correct vision defects, tinted lenses (whether optically active or not) and plain lenses worn for protective or cosmetic purposes.

It has previously been proposed to support the lenses of a pair of spectacles from a support which rests against the forehead of the wearer and includes rearward extensions which engage the rear of the head of the wearer. Such an arrangement is, for example, proposed in British Patent No. GB-A-2288883. While such spectacle supports offer a number of well recognized advantages, they also have a number of shortcomings including, in particular, relatively complex construction. The complex nature of the supports renders them unsuitable for the production of low cost spectacles.

SUMMARY OF THE INVENTION

The present invention is directed to a spectacle support of the forehead type which can be manufactured at extremely low cost and yet which is highly versatile in providing a comfortable and effective fit to a wide range of head shapes. The new support is also highly durable. This combination of desirable characteristics renders the new spectacle support particularly suitable for the production of low cost spectacles suitable for use in the third world.

According to one aspect of the present invention a spectacle support comprises a unitary strip of spring steel material bent to provide a central curved forehead-engaging portion and a pair of rearwardly extending arms, the arms being connected to the forehead-engaging portion by a step whereby, when the spectacle support is positioned on the head of a wearer, the portions of the spectacle support overlying the temples are spaced outwardly off the temples and apply no pressure thereto.

Because the preferred spectacle support is a unitary structure which can be bent from suitable strip spring steel material, the spectacles incorporating the support can be produced very cheaply. Further, it has been found that by appropriate shaping of the arms, a single size of spectacle support can be worn comfortably by people having a wide range of head sizes and shapes. In the preferred embodiment of the invention the arms are curved so that they extend inwardly behind the rear of the head of the wearer and somewhat downwardly. Preferably in the relaxed condition of the spectacle support the arms overlap each other at approximately their mid-points. Such a structure can readily be compressed somewhat from its relaxed condition in order to permit compact storage of the spectacles. The arms, when bent outward to be passed either side of the head of a wearer automatically bend at the curved forehead portion into the required profile. When released, the arms exert a gentle inward pressure on the head and maintain the forehead portion in the correct position.

The lenses of the spectacle may be attached to the spectacle support by any convenient means as, for example, by use of a central support which extends upwardly from a lens sub-frame to be secured to the central region of the spectacle support. If the lens sub-frame is a plastics molding it can conveniently be secured to the spectacle support by means of a metal clip which is embedded, e.g. by ultrasonic heating, in the plastics material of the sub-frame. If the lens sub-frame is of metal the sub-frame can be secured to the spectacle support by a metal support which clips at one end to the spectacle support and at the other end to the metal sub-frame. In one preferred arrangement the metal support is hingedly connected to both the spectacle support and the lens sub-frame so that the position of the lens sub-frame can be adjusted relative to the spectacle support to vary the vertex distance of the lenses from the eyes of the wearer.

In one embodiment of the invention the strip material is bent so that the major transverse dimension of the strip material is generally vertical throughout the spectacle support, when the spectacles are in their loose configuration. In a second embodiment of the invention the strip material is twisted in the region of the steps at either side of the forehead portion so that the major transverse dimension of the strip in the forehead portion extends generally horizontally while the major transverse dimension of the strip throughout the rest of the support extends vertically. This arrangement gives added stiffness to the forehead portion without significantly adding to the manufacturing costs of the support. Such an arrangement might provide a comfortable fit in circumstances where the first embodiment cannot provide a comfortable fit.

The invention will be better understood from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring now to drawing FIGS. 1–5, the illustrated spectacle support 1 is a unitary strip 2 of suitable spring steel material, for example austenitic stainless steel or carbon spring steel. If the material is prone to corrosion it is preferably formed with a corrosion-resistant coating, for example of zinc. The strip may, if desired, be formed with a decorative coating, for example of paint or powder coating or decorative metal, for example gold or chromium.

The strip material may be formed into the required shape by conventional forming techniques and, in order to achieve the required resilience in the finished product it is preferable that the strip material is supplied in a semi-hard state. The forming operation comprises the steps of bending, using either a machine press or a series of hand presses, to produce the required curves. The strip is then heat tempered to achieve full hardness and maximum resistance to non-elastic deformation.

Figure 1:
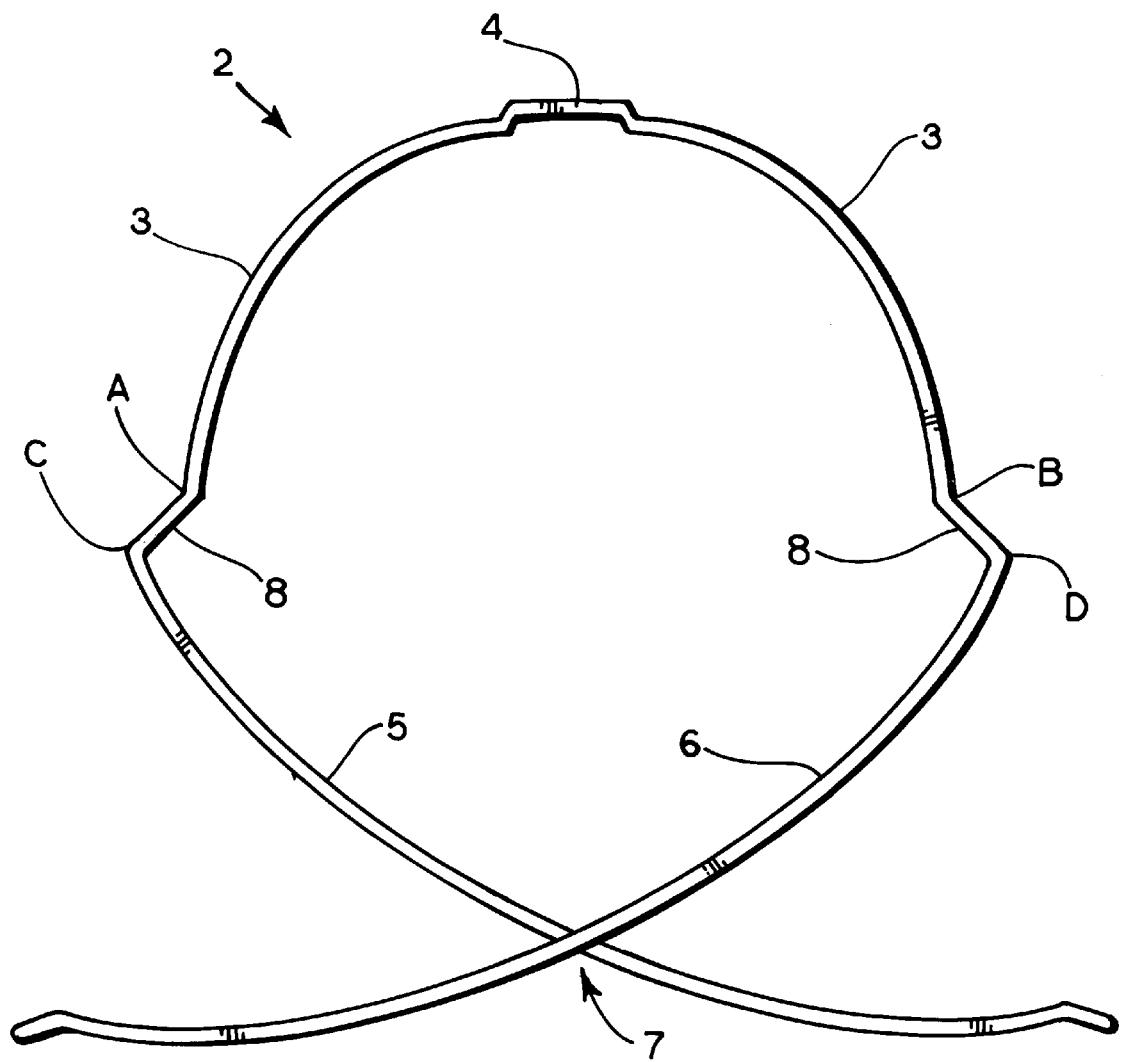
FIG. 1 illustrates in plan view a first embodiment of the invention in its relaxed condition.
Figure 2:
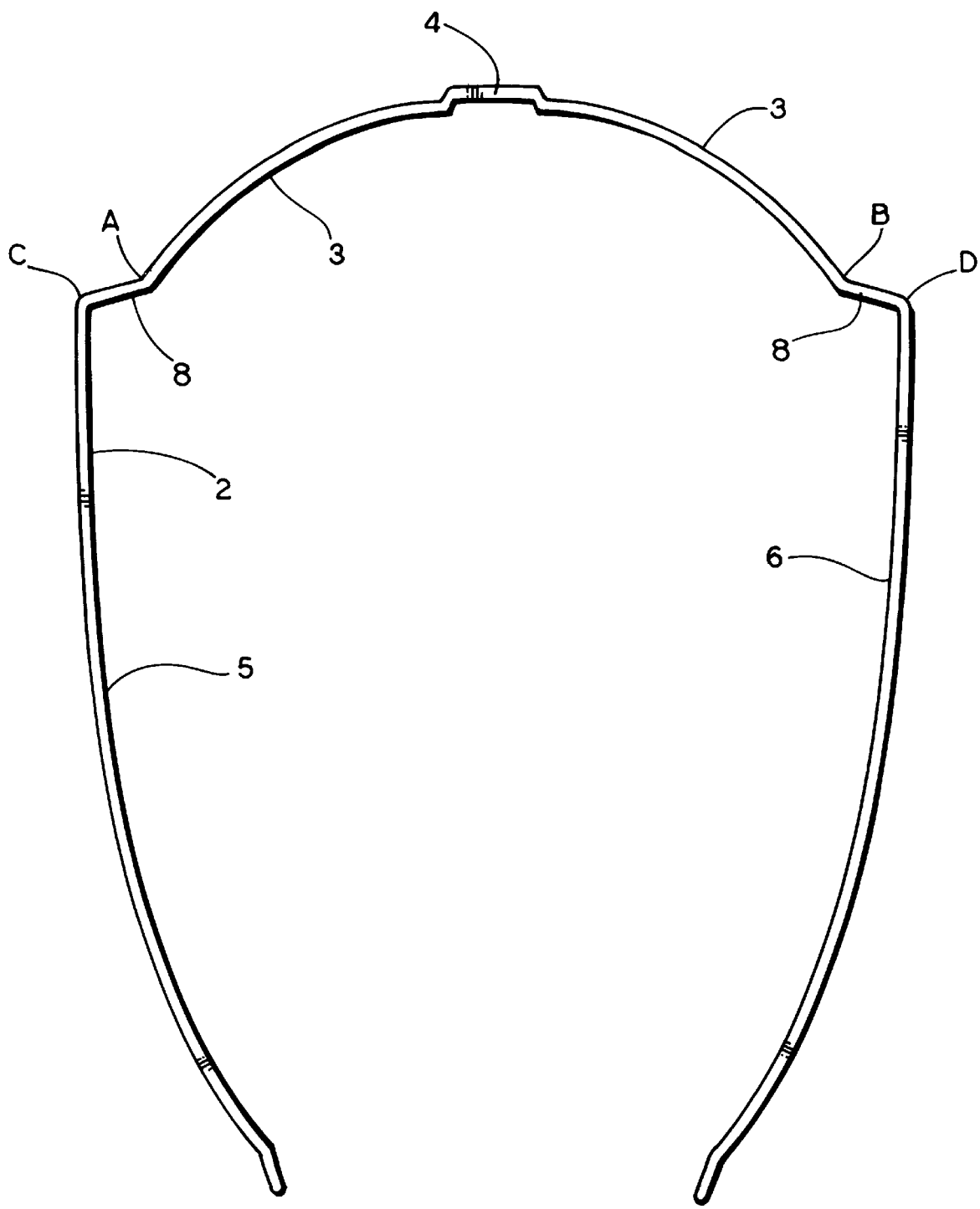
FIG. 2 illustrates the embodiment of FIG. 1 when elastically deformed to its use configuration.
Figure 2A:
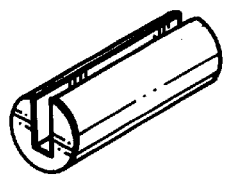
FIG. 2A is a perspective view of a hinge mounting member for use with the embodiment of FIGS. 1 and 2.

In the relaxed condition of the spectacle support the strip material 2 defines a central curved portion 3 which extends generally from the point A to the point B. The curved portion 3 includes a central region 4 which is stepped outwardly somewhat from the general curve of the portion 3. The central portion 4 may be used to attach a lens sub-frame to the spectacle support using a clip. The offset ensures that the clip does not rub against the forehead of the wearer. In one embodiment of the invention the lens subframe is attached to the spectacle support by a metal clip which forms a hinged connection with the spectacle support. To this end, a bushing as illustrated in FIG. 2A, may be fitted over the central portion 4 of the strip material to form a cylindrical pin for the hinge.

Figure 3:
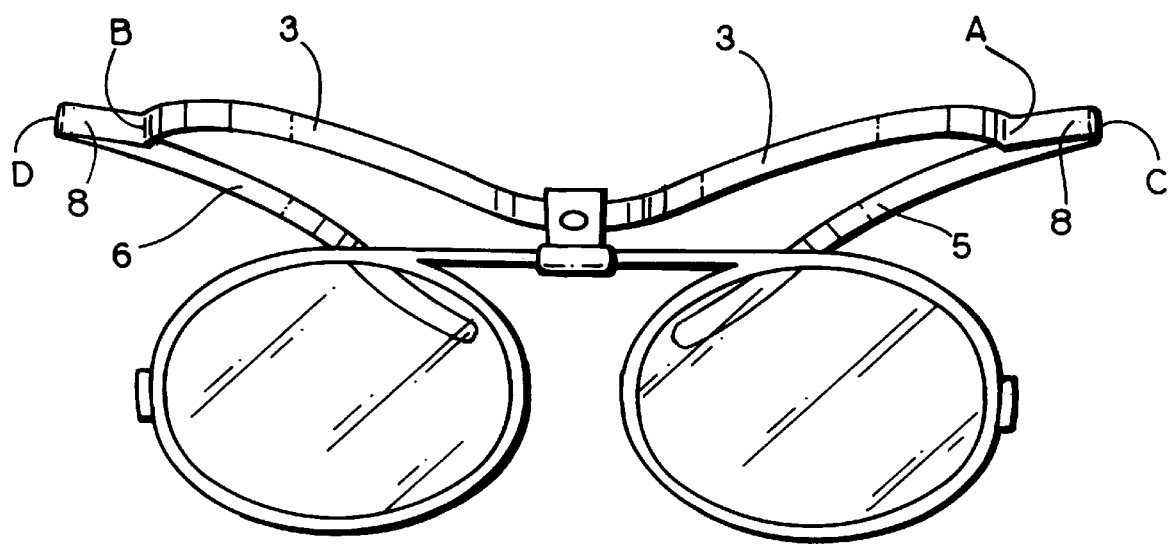
FIG. 3 is a front view of the support of FIG. 2 with a lens subframe mounted thereon.
Figure 4:
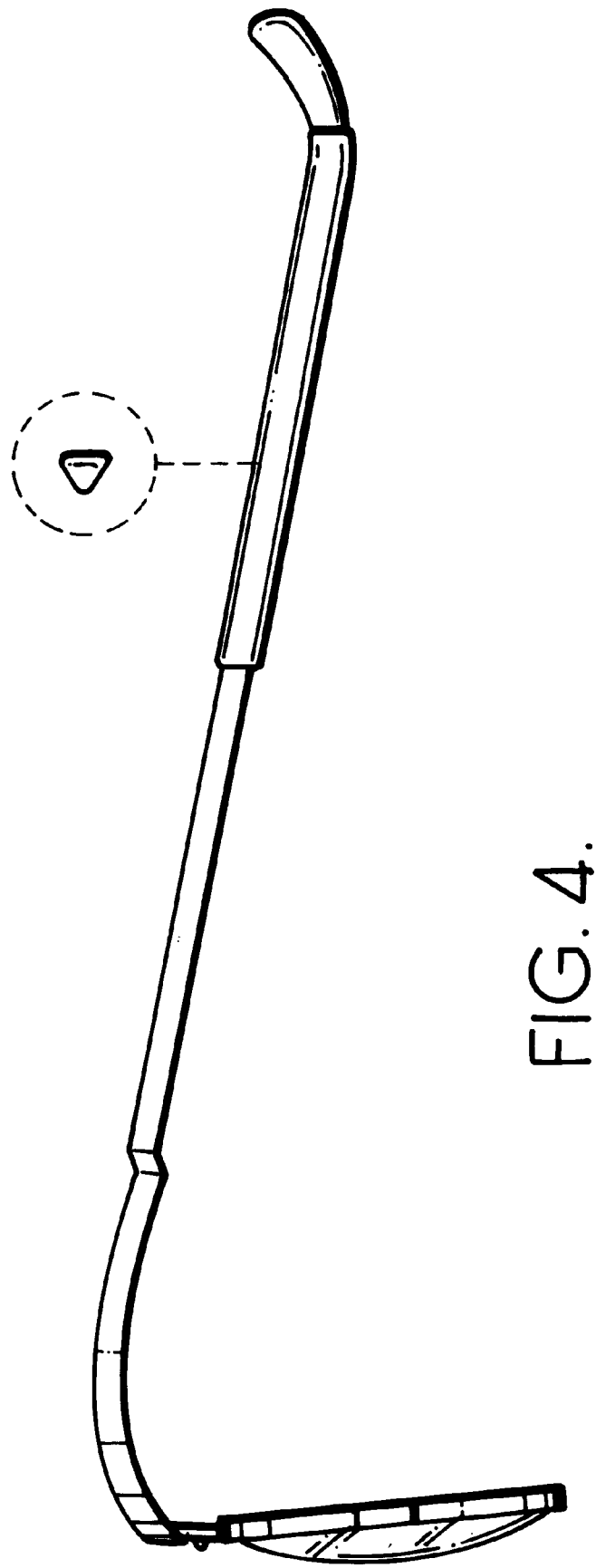
FIG. 4 is a side view of the spectacles of FIG. 3 with an extruded sleeve mounted on the side arms thereof.
Figure 5:
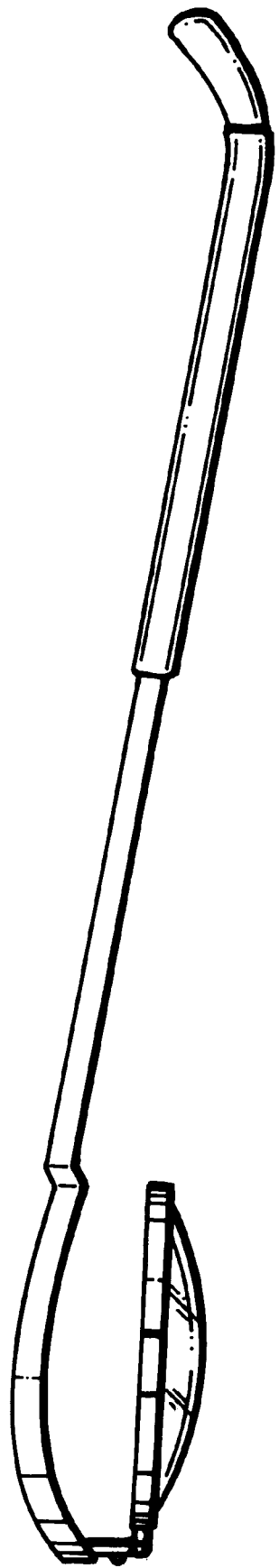
FIG. 5 is a view corresponding to FIG. 4 but showing the lens subframe in its storage position.

The spectacle support also includes arms 5 and 6 which extend from opposite sides of the central curved region 3. The arms 5 and 6 are themselves curved so that, when in their use configuration, as illustrated in FIGS. 2, 3 and 4, they extend rearwardly behind the head of a wearer and somewhat downwardly. In the natural relaxed condition of the spectacle support, the arms 5 and 6 cross at a point 7 approximately mid-way along the length of each arm. With such an arrangement the arms can be pushed towards the curved portion 3 to reduce the overall dimension of the spectacles and permit them to be placed in a storage case or pouch.

Between the points A and B at either end of the curved portion 3 and the beginnings of the arms 5 and 6 at points C and D there is an outward step 8 in the profile of the support. This outward step 8 has the effect of ensuring that, at the point where the support crosses the temples of the wearer, the support is positioned outwardly of the temples and applies no inward pressure to the temples. This is particularly important to secure a comfortable fit which does not induce discomfort after long periods of use.

To enhance the comfort of a wearer over prolonged periods of wear, the metal strip may be coated with a soft material, especially in the regions where it contacts the head of the wearer. For low cost production, such coating can be effected cheaply by sliding lengths of preformed soft synthetic resin tubing over the relevant portions of the spectacle support. Alternatively the required coating can be applied by dipping or by using extruded or molded lengths of special section as, for example, of an elastomeric silicone polymer.

In FIG. 4 a suitable length of extruded elastomeric silicone polymer is shown positioned over one of the arms. The profile of the elastomeric silicone polymer leads to comfortable contact with the head and enhances the appearance of the product.

Figure 6:
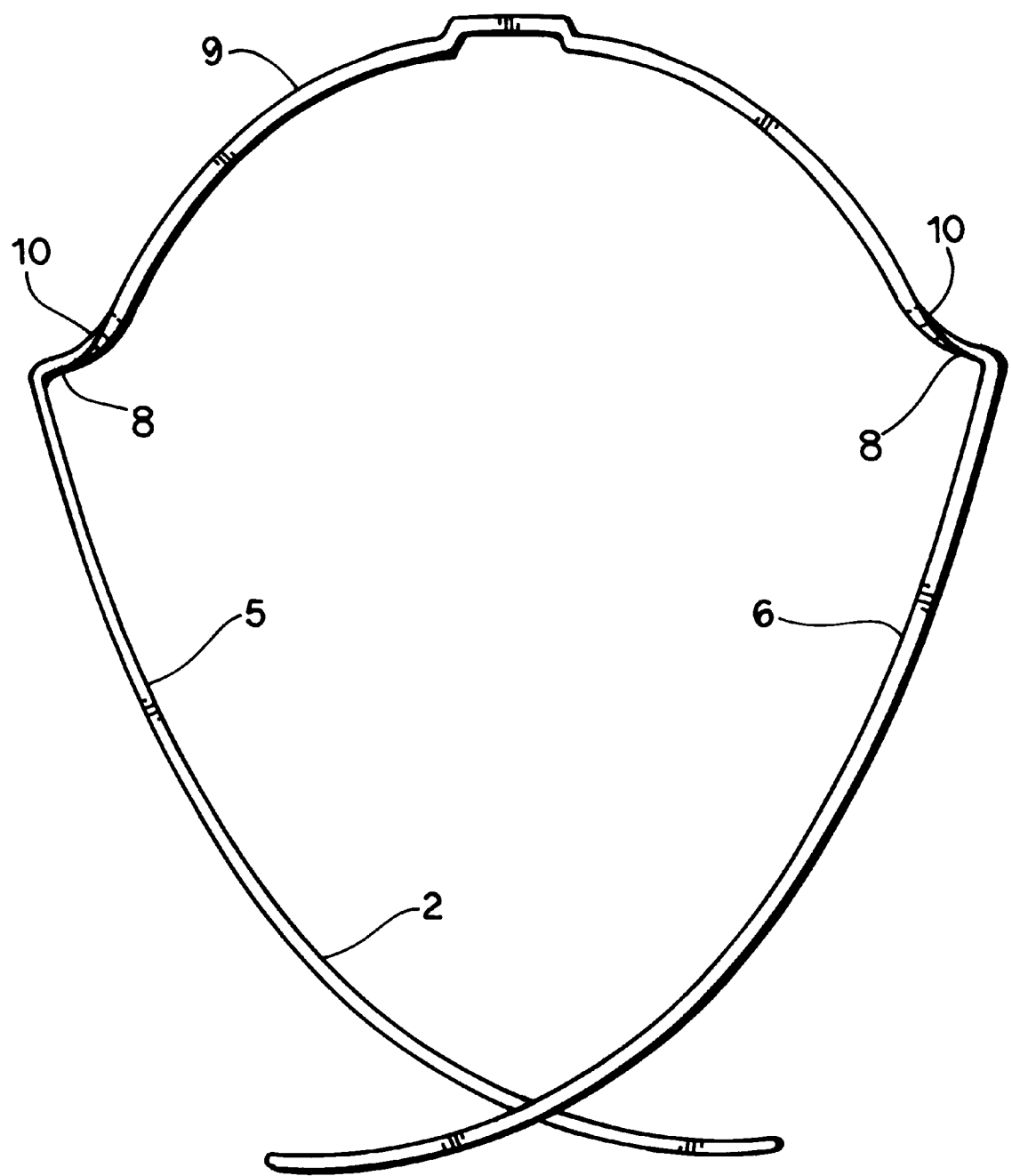
FIG. 6 is a view corresponding to FIG. 1 of a second embodiment of the invention.

In the embodiment illustrated in FIGS. 1–5, the strip material 2 is arranged so that the major transverse dimension of the strip material is oriented generally vertically throughout the length of the support, when the support is in its use configuration. In the embodiment depicted in FIG. 6, the central portion of the spectacle support, generally between the points A and B, extends with the major transverse dimension of the strip 2 generally horizontal. This is achieved by placing a 90° twist in the strip material 2 at the points A and B. The effect of twisting the material in this manner is to render the central portion of the support, that is the portion between points A and B, more resistant to deformation as the arms 5 and 6 are extended into their use configuration. For this reason, the central curved region 3A of this embodiment is formed to a larger radius curve than in the case of the previous embodiments depicted in FIGS. 1–5. Similarly, in the relaxed condition of the spectacle support, the arms overlap adjacent the free ends of the arms. It has been found in certain circumstances that such a spectacle support of FIG. 6 provides a more comfortable fit. As in the case of FIGS. 1–5 it will be noted that there is an outward step in the profile of the spectacle support between the points A and B at the ends of the curved central portion 3A and the points C and D which represent the beginnings of the arms. This outward step avoids pressure on the temples as previously described.

The present invention may be constructed of a wide range of sizes of strip material. In general, for any particular material, the thicker the material the larger will be the force required to deform the material from the storage to the use configuration. Accordingly, if the spectacle support is made from material having a very small cross-section, the spectacle support can have a natural relaxed state which is very compact since this compact state can be deformed to the required use state using relatively little force. Accordingly, in the use state, the arms will exert a relatively small force on the head of the wearer.

Figure 7:
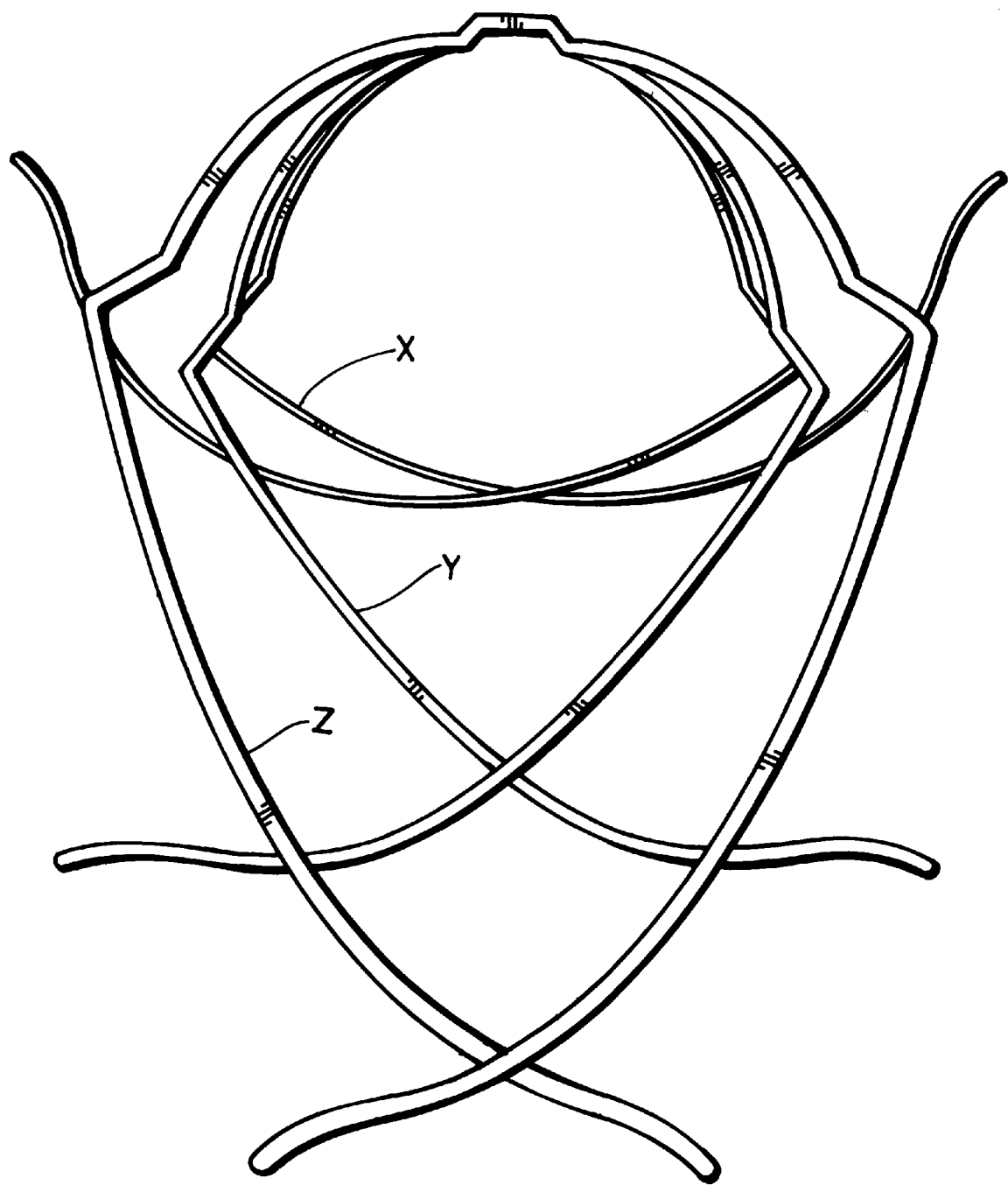
FIG. 7 illustrates the effect of material cross-section on the relaxed shape of the spectacle frame.

FIG. 7 illustrates the relaxed state of three possible forms of spectacle support, each of which will adopt the shape shown in FIG. 2 when deformed into a use configuration. The spectacle support X is formed of spring steel material having a cross-section of 0.5 mm×2.5 mm; spectacle support Y is formed of spring steel material having a cross-section of 0.8 mm×2.8 mm; and spectacle support Z is formed of spring steel material having a cross-section of 1 mm×4 mm.

It is to be understood that while certain forms of the present invention have been illustrated and described herein, it is not to be limited to the specific forms or arrangement of parts described and shown.

What is claimed and desired to be secured by Letters Patent is as follows:

1. A spectacle structure comprising:
   a) a unitary frame having a central portion engaging the forehead of a wearer and a pair of rearwardly extending arm portions;
   b) said frame including a pair of step portions intercoupling said central portion and said arms in spaced, nonengaging relation to the temples of the wearer;
   c) a pair of lenses;
   d) a subframe mounting said lenses; and
   e) a support intercoupling said frame and said subframe.

2. The spectacle structure as set forth in claim 1 wherein said frame is shapable to fit wearers having heads of different sizes.

3. The spectacle structure as set forth in claim 2 wherein said frame is constructed of spring steel.

4. The spectacle structure as set forth in claim 1 wherein:
   a) said frame is constructed of an elongate strip having a transverse dimension; and
   b) said transverse dimension has a vertical orientation.

5. The spectacle structure as set forth in claim 1 wherein;
   a) said arm portions each have a rearward portion; and
   b) said rearward portion is enclosed in a synthetic resin material for cushioning contact of said arm portions with the rear of the head of a wearer.

6. The spectacle structure as set forth in claim 1 wherein said support couples said subframe in dependent relationship to said frame.

7. The spectacle structure as set forth in claim 1 wherein said support hingedly intercouples said frame and said subframe to permit rotation of said subframe for adjustment of the distance between said lenses and the eyes of a wearer.

8. The spectacle structure as set forth in claim 1 wherein:
   a) said subframe is constructed of a synthetic resin material.

9. The spectacle support structure as set forth in claim 8 wherein:
   said a support intercoupling said frame and said subframe comprises an embedded metal clip.

10. The spectacle structure as set forth in claim 1 wherein:
    a) said arm portions each have a forward end and a rearward end;
    b) said spectacle structure has a use configuration when engaged on the head of a wearer and a nonengaged, relaxed configuration; and
    c) said arms overlap midway between said forward and said rearward ends when in said relaxed configuration.

11. A spectacle structure comprising:
    a) a unitary, elongate frame having a transverse dimension;
    b) said frame including a forehead-engaging central portion wherein said transverse dimension has a horizontal orientation, and a pair of rearwardly extending arm portions wherein said transverse dimension has a vertical orientation;
    c) said frame including a pair of step portions twistedly intercoupling said central portion and said arm portions in spaced, nonengaging relation to the temples of a wearer;
    d) a pair of lenses;
    e) a subframe mounting said lenses; and
    f) a support intercoupling said frame and said subframe.

12. The spectacle structure as set forth in claim 11 wherein said frame is shapable to fit wearers having heads of different sizes.

13. The spectacle structure as set forth in claim 12 wherein said frame is constructed of spring steel.

14. The spectacle structure as set forth in claim 11 wherein:
    a) said arm portions each include a rearward portion; and
    b) said rearward portion is enclosed in a synthetic resin material for cushioning contact of said arm portions with the rear of the head of a wearer.

15. The spectacle structure as set forth in claim 11 wherein said support couples said subframe in dependent relationship to said frame.

16. The spectacle structure as set forth in claim 11 wherein said support hingedly intercouples said frame and said subframe to permit rotation of said subframe for adjustment of the distance between said lenses and the eyes of a wearer.

17. The spectacle structure as set forth in claim 11 wherein:
    a) said subframe is constructed of a synthetic resin material.

18. The spectacle structure as set forth in claim 17 wherein:
    said a support intercoupling said frame and said subframe comprises an embedded metal clip.

19. The spectacle structure as set forth in claim 11 wherein:
    a) said arm portions each have a forward end and a rearward end;
    b) said spectacle structure has a use configuration when engaged on the head of a wearer and a nonengaged, relaxed configuration; and
    c) when in said relaxed configuration, said arms overlap adjacent said rearward ends.

20. A spectacle structure comprising:
    a) a unitary, elongate spring steel frame having a transverse dimension;
    b) said frame including a forehead-engaging central portion wherein said transverse dimension has a horizontal orientation, and a pair of rearwardly extending arm portions wherein said transverse dimension has a vertical orientation;
    c) said arm portions each including a rearward portion;
    d) said rearward portions enclosed in a synthetic resin material for cushioning contact of said arm portions with the rear of the head of a wearer;
    d) said frame including a pair of step portions twistedly intercoupling said central portion and said arms in spaced, nonengaging relation to the temples of the wearer;
    e) a pair of lenses;
    f) a subframe mounting said lenses; and
    g) a support hingedly intercoupling said subframe to said frame in dependent relationship to permit rotation of said subframe for adjustment of the distance between said lenses and the eyes of a wearer.

* * * * *